United States Patent [19]

Boardman et al.

[11] 4,128,690
[45] Dec. 5, 1978

[54] TOUGHENED GLASS SHEETS

[75] Inventors: James Boardman, Kings Norton; Peter M. Ash, Studley, both of England

[73] Assignee: Triplex Safety Glass Company Limited, Kings Norton, England

[21] Appl. No.: 773,165

[22] Filed: Mar. 1, 1977

[30] Foreign Application Priority Data

Mar. 5, 1976 [GB] United Kingdom ............... 8995/76

[51] Int. Cl.² ............................................. C08B 27/00
[52] U.S. Cl. ..................................... 428/332; 65/114; 65/115; 428/220; 428/410
[58] Field of Search ............. 428/220, 410, 332; 65/115, 114

[56] References Cited

U.S. PATENT DOCUMENTS

| 1,916,174 | 6/1933 | Long et al. | 65/115 X |
| 2,078,541 | 4/1937 | Monnier | 65/114 X |
| 2,167,294 | 7/1939 | Despret | 65/114 |
| 3,849,100 | 11/1974 | Luppino | 65/114 X |

*Primary Examiner*—Arthur D. Kellogg
*Attorney, Agent, or Firm*—Burns, Doane, Swecker & Mathis

[57] ABSTRACT

Thermally toughened glass sheets of thickness 2.5 mm to 3.5 mm, for use as motor vehicle side or rear windows, are produced by differential quenching producing a distribution of regions of more highly toughened glass interspersed with regions of lesser toughened glass. The average central tensile stress is in the range 62 MN/m² to 53 MN/m², and there is a distribution of areas in which the principal stresses acting in the plane of the glass sheet are unequal. The principal stress difference in some of the areas is at a maximum in the range 8 MN/m² to 25 MN/m², the major principal stresses in adjacent areas in which the principal stress difference is a maximum are in different directions, and the distance between the centers of such adjacent areas is in the range 15 mm to 30 mm.

4 Claims, 14 Drawing Figures

TOUGHENED GLASS SHEETS

BACKGROUND OF THE INVENTION

1. Field of the Invention

This invention relates to the production of flat or curved sheets of thermally toughened glass, such as are used for example as motor vehicle side or rear windows.

2. Description of the Prior Art

Such a glass sheet may be toughened by heating the glass sheet to a temperature near to the softening point of the glass and then subjecting the glass sheet to a rapid chilling effected by directing quenching jets, usually of air, simultaneously against both surfaces of the glass sheet. Cooling of the surfaces of the glass sheet in this manner sets up centre-to-surface temperature gradients through the thickness of the glass sheet which are maintained whilst the glass cools through its strain point, and result in the production of permanent compressive stresses in the surface layers of the glass sheet, with compensating tensile stresses in the centre of the glass thickness. The degree of toughening achieved varies with the rate of chilling and increases with increasing chilling rate.

The quenching jets are usually oscillated multi-directionally over the surfaces of the glass sheet so as to produce a uniformly toughened glass sheet in which the tensile stresses in the centre of the glass thickness are of equal magnitude in all directions of the plane of the glass sheet, by smoothing out the localised cooling effect of the quenching jets impinging on the glass sheet.

Such glass sheets when toughened by air quenching generally have a ratio of surface compressive stress to central tensile stress of about 2:1 and thus the degree of toughening can simply be specified by reference to the central tensile stress present in the glass sheets.

When such uniformly toughened glass sheets are fractured they break up into small particles of glass (termed "dicing").

The manner in which the glass sheets fracture and in particular the fineness of dicing depends on the degree to which the glass sheets are toughened. In general the fineness of the dicing increases with increase in the degree of toughening.

In most countries there are official regulations specifying the fracture requirements for toughened glass sheets which are to be used as side or rear windows for motor vehicles.

Typically such regulations specify that the toughened glass sheet shall be fractured by localised impact at a defined position on the glass sheet, two particular positions being at the geometrical centre of the glass sheet and at a position adjacent the edge of the sheet. It is then required that areas of the fractured glass sheet should be selected where the particle count is a minimum and where the particle count is a maximum and limitations are placed on the minimum and maximum particle counts permissible in such areas. The minimum particle count permissible determines the maximum size of particles resulting from fracture so as to limit the danger of laceration by larger particles subsequent to fracture of the glass sheet in an accident. The maximum particle count permissible determines the minimum fineness of particles resulting from accidental fracture of the glass sheet so as to limit the danger of ingestion of fine glass particles.

At present motor vehicle side and rear windows are made from glass of about 4.0 mm to 6.0 mm thickness and can be uniformly toughened in the manner described above so as to meet official fracture requirements.

For example glass sheets of thickness 4 mm and above meet the proposed E.E.C. standard referred to below if uniformly toughened to have a central tensile stress in the range 55 MN/m$^2$ to 59 MN/m$^2$. However, in the interest of reducing weight, there is now a trend towards the use of thinner glass in motor vehicles e.g. of about 3.0 mm thickness, glass of thickness in the range 2.5 mm to 3.5 mm being of particular interest.

In the draft standard under discussion by the European Economic Community (E.E.C) it is required that the number of particles in any 5 cm $\times$ 5 cm square traced on the fractured glass, excluding a 3 cm wide band around the edge of the glass sheet and a circular area of 7.5 cm radius around the point from which fracture was initiated, should be 50 at the minimum and 300 at the maximum.

It has been found difficult to toughen such thinner glass sheets to meet the official fracture requirements. In particular it has been found that the difficulty of toughening glass sheets of thickness 3.5 mm or less to meet the official fracture requirements, increases with increasing glass size. The difficulty is particularly evident at a size greater than about 1100 mm $\times$ 500 mm. This is about the size of the smallest vehicle rear window in current production. Many vehicle side windows are also of about this size or greater. Further it has not been found possible to produce uniformly toughened side and rear windows of about 3.0 mm in thickness by conventional air toughening practice, which will meet the requirements of the proposed E.C.C. standard for minimum and maximum particle counts when broken from the specified fracture positions, particularly at the position of the geometrical centre of the glass sheet. If such a glass sheet is uniformly toughened to meet the requirement of the proposed E.E.C standard for minimum particle count it is found that the requirement for maximum particle count is exceeded and vice versa.

The proposed E.E.C. standard also has a requirement that the fractured glass sheet should not contain any elongated particles with jagged ends of more than 6 cm in length, such particles being referred to as "splines". It has also not been found possible to produce a uniformly toughened glass sheet of about 3.0 mm in thickness which will meet this requirement as the fractured glass sheet usually contains splines.

British Standard No. BS 5282 entitled "Road Vehicle Safety Glass" is less restrictive than the proposed E.E.C. standard in that it specifies for glass less than 4 mm in thickness, a minimum particle count of 40 in a 5 cm $\times$ 5 cm square may be permitted and the maximum permitted particle count in a 5 cm $\times$ 5 cm square may be 400. The British Standard also basically prohibits the presence of splines of more than 6 cm in length in the fractured test glass. It has been found possible, by close control of existing toughening methods, to produce uniformly toughened glass sheets of about 3.0 mm thickness which will meet the requirements of this British Standard for minimum and maximum particle counts. However such close control is difficult to achieve in routine commercial manufacture.

The main difficulty in complying with the British Standard arises, however, in having to meet the basic requirement that no splines are to be present in the fractured glass sheet.

It has now been discovered that glass sheets of the kind used as motor vehicle side or rear windows, which are from 2.5 mm to 3.5 mm thick, particularly sheets 3 mm thick, can be toughened in a way which meets official fracture requirements such as the proposed E.E.C. standard.

SUMMARY

The invention provides a glass sheet for use as a side or rear window for a motor vehicle and of thickness in the range 2.5 mm to 3.5 mm which sheet is differentially quenched to produce to the glass sheet a distribution of regions of more highly toughened glass interspersed with regions of lesser toughened glass. The average central tensile stress in the glass sheet is in the range of from a maximum of 62 $MN/m^2$ for all glass thicknesses from 2.5 mm to 3.5 mm to a minimum of 56.5 $MN/m^2$ for 2.5 mm thick glass varying inversely with thickness down to a minimum of 53 $MN/m^2$ for 3.5 mm thick glass. There is also a distribution of areas in the glass sheet in which the principal stresses acting in the plane of the glass sheet are unequal, the principal stress difference in at least some of said areas being at a maximum in the range 8 $MN/m^2$ to 25 $MN/m^2$, the major principal stresses in adjacent areas in which the principal stress difference is a maximum being in substantially different directions, and the distance between the centres of such adjacent areas being in the range 15 mm to 30 mm.

Toughened glass sheets having the above characteristics will at least meet an official fracture requirement for a minimum particle count of 40 and a maximum particle count of 400 in a 5 cm × 5 cm square on the fractured glass sheet as for example laid down in British Standard No. BS 5282. Such glass sheets will also meet the basic requirement in British Standard No. BS 5282 that the fractured glass sheet shall not contain any splines which are more than 6 cm in length.

The average central tensile stress in the glass sheet may be in the range from a maximum of 59.5 $MN/m^2$ for all glass thicknesses from 2.5 mm to 3.5 mm to a minimum of 58 $MN/m^2$ for 2.5 mm thick glass varying inversely with thickness down to a minimum of 54.5 $MN/m^2$ for 3.5 mm thick glass.

Such glass sheets will meet a more restricted official fracture requirement for a minimum particle count of 50 and a maximum particle count of 300 in a 5 cm × 5 cm square on the fractured glass sheet as for example specified in the proposed E.E.C. standard. Glass sheets having such characteristics will also usually meet the requirement in the proposed E.E.C. standard that the fractured glass sheet should not contain any splines of greater than 6 cm in length.

It is preferred that there be a regular distribution of said regions of more highly toughened glass uniformly interspersed with regions of lesser toughened glass.

The invention also provides a method of producing a glass sheet of thickness in the range 2.5 mm to 3.5 mm for use as a rear or side window of a motor vehicle, comprising quenching a distribution of regions of the glass sheet at a maximum rate so that interspersed regions of the glass sheet are simultaneously quenched at a minimum rate, regulating said maximum quenching rate and the size and spacing of the regions of the glass sheet which are quenched at the maximum rate such that an average central tensile stress is produced in the glass sheet within a range from a maximum of 62 $MN/m^2$ for all thicknesses of glass from 2.5 mm to 3.5 mm to a minimum of 56.5 $MN/m^2$ for 2.5 mm thick glass varying inversely with thickness down to a minimum of 53 $MN/m^2$ for 3.5 mm thick glass, and such that there is produced in the glass sheet distribution of areas in which the principal stresses acting in the plane of the glass sheet are unequal, the principal stress difference in at least some of said areas being at a maximum in the range 8 $MN/m^2$ to 25 $MN/m^2$, the major principal stresses in adjacent areas in which the principal stress difference is a maximum being in different directions, and the distance between the centres of such adjacent areas being in the range 15 mm to 30 mm.

In one way of carrying out the method quenching is effected by directing quenching jets at the glass sheet and imparting a vertical oscillation to the quenching jets to produce said distribution of regions of the glass sheet quenched at a maximum rate.

In another way of operating the method quenching is effected by directing quenching jets at the glass sheet and imparting a circular oscillation to the quenching jets to produce said distribution of regions of the glass sheet quenched at a maximum rate. The quenching jets may be held stationary for a predetermined time during the quenching period.

Further the quenching may be effected by directing stationary quenching jets at the glass sheet to produce said distribution of regions of the glass sheet quenched at a maximum rate.

BRIEF DESCRIPTION OF THE DRAWINGS

Some embodiments of the invention will now be described, by way of example, with reference to the accompanying drawings in which.

DESCRIPTION OF THE PREFERRED EMBODIMENTS

Figure 1:
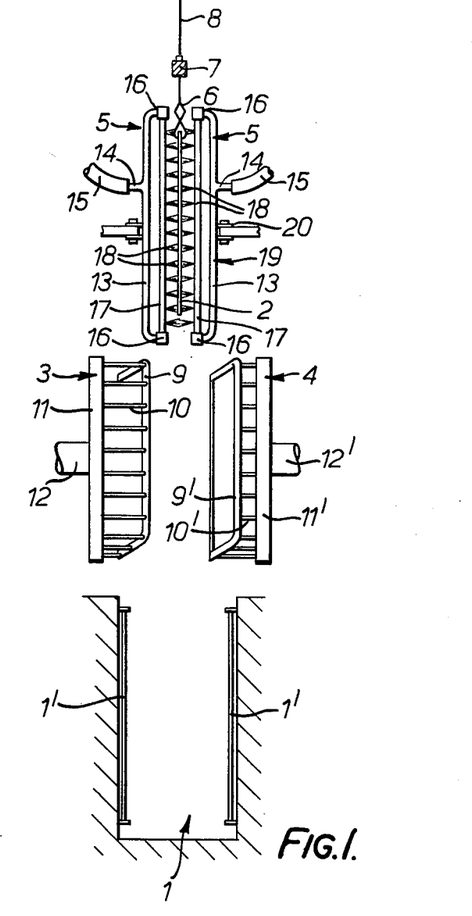
FIG. 1 is a schematic side elevation of an installation for die bending and toughening a sheet of glass to produce a toughened glass sheet according to the invention.
Figure 2:
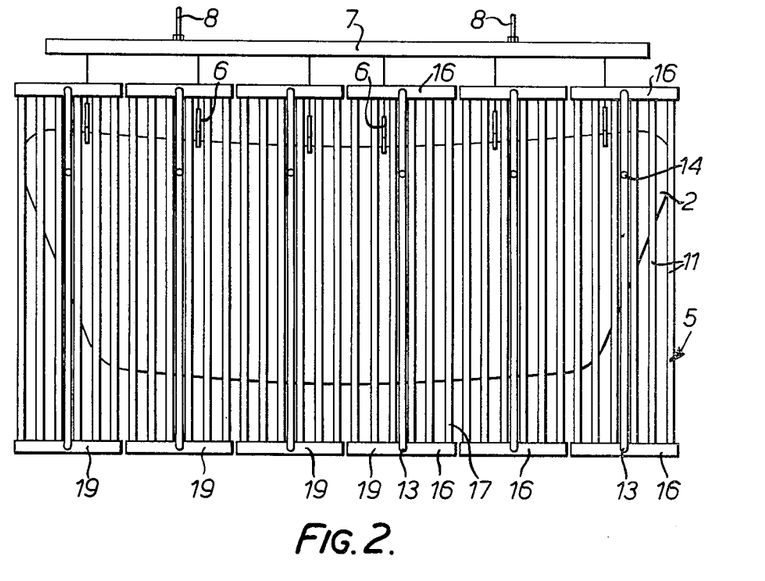
FIG. 2 is a detailed front elevation of high pressure quenching frames which form part of the installation of FIG. 1.

The installation of FIGS. 1 and 2 is of conventional kind and includes a furnace 1 for heating of a sheet of glass 2 which is to be bent and toughened. A pair of bending dies 3 and 4 are located above the furnace 1 and a pair of opposed air quenching frames 5 are positioned above the dies 3 and 4. The glass sheet 2 is carried by tongs 6 which are hung from a tong bar 7. The tong bar 7 is suspended by wires 8 from hoisting gear of known form.

Heating of a glass sheet 2 when suspended from the tong bar 7 in the furnace 1 is by means of radiation from heating elements 1' which are mounted on opposite walls of the furnace 1 facing the glass sheet 2.

The bending dies comprise a female die 3 and a male die 4. The female die 3 includes a rim frame member 9 of concave curvature which is mounted by adjuster screws 10 from a backing plate 11. The male die 4 is of similar construction to the female die 3 and includes a rim member 9' of convex curvature which is mounted by adjuster screws 10' from a backing plate 11'. The backing plate 11 of the female die 3 is mounted on an actuator ram 12, and the backing plate 11' of the male die 4 is mounted on a similar actuator ram 12'.

The quenching frames 5 are of the high pressure type and comprise vertical feed pipes 13 having branches 14 connected by flexible hoses 15 to an air supply, not shown. The feed pipes 13 communicate with headers 16 connected by a series of perforated tubes 17 each of which has a series of spaced apertures 18 along its length. In the construction shown in more detail in FIG. 2, the quenching frames 5 are of articulated form, each comprising a set of sub-units 19 each including a number of the apertured tubes 17, associated individual headers 16 and with a feed pipe 13 supplying each of the sub-units 19. Each of the sub-units 19 is pivoted on a hinge such as indicated at 20 in FIG. 1. The sub-units 19 of the quenching frames 5 can be arranged either in parallel planes or a curved configuration for the purpose of quenching a glass sheet 2 which has been bent between the dies 3 and 4 after it has left the furnace and prior to quenching.

Figure 3:
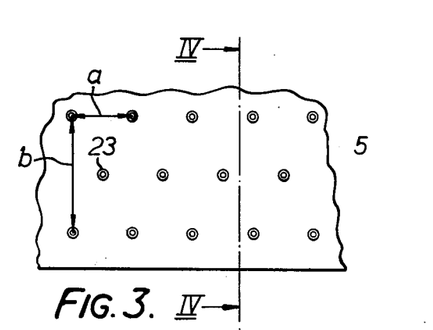
FIG. 3 is a detail in front elevation of low pressure quenching boxes for use in the installation of FIG. 1.
Figure 4:
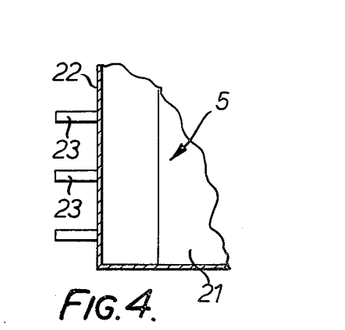
FIG. 4 is a section on line IV—IV of FIG. 3.

FIGS. 3 and 4 show details of low pressure quenching boxes 5 which can be used as an alternative to the high pressure quenching frames of FIGS. 1 and 2. Each low pressure quenching box 5 comprises a manifold 21 having a face plate 22 which is curved to match the curvature of a glass sheet after it has been bent. A series of quenching nozzles 23 are plugged into the face plate 22 and are arranged in the Domino 5 pattern shown in FIG. 3.

In the use of the installation a glass sheet 2 is suspended in the furnace 1 from the tong bar 7 which is in a lowered position. When the glass sheet 2 has been heated to a temperature suitable for bending and subsequent quenching the tong bar 7 is raised to lift the glass sheet 2 into a position between the open bending dies 3 and 4. The dies 3 and 4 are then closed on to the hot sheet 2 and bend the sheet 2 to a desired curvature. After bending, the dies 3 and 4 are opened, and the tong bar 7 is raised further to lift the bent glass sheet 2 into position between the quenching frames 5. Usually the quenching frames 5 are mounted so as to be retractable from one another to permit positioning of the bent glass sheet between the quenching frames 5 which are then advanced into position for quenching of the glass sheet.

The sub-units 19 of the frames 5 are already adjusted relative to each other to match the curvature of the bent glass sheet.

The glass sheet is quenched by the air streams from the apertures 18 in the tubes 17 of the quenching frames 5, or through the nozzles 23 of the low pressure type of quenching boxes such as are shown in FIGS. 3 and 4.

In the conventional air toughening process the quenching frames whether of the high pressure type as shown in FIGS. 1 and 2 or of the low pressure box type shown in FIGS. 3 and 4 are oscillated multi-directionally with respect to the surfaces of the glass sheet so as to equalise the rate of cooling over the surfaces of the glass sheet. Uniform cooling of the surfaces of the glass sheet in this manner sets up a centre-to-surface temperature gradient through the thickness of the glass sheet which is maintained while the glass cools through its strain point. This results in the production of a uniform tensile stress in the centre of the glass thickness which is of equal magnitude in all directions in the plane of the glass sheet. A compensating compressive stress is produced in the surfaces of the glass sheet and the ratio of the central tensile stress to the surface compressive stress produced in the glass sheet is about 2:1.

The intensity of the air streams is controlled, by controlling the air feed pressure, so as to achieve a required degree of toughening of the glass sheet. The degree of toughening required to be achieved is governed by the need to obtain particular fracture characteristics in the toughened glass sheet so as to meet the various official standards which exist in different countries.

One such standard is the proposed European Economic Community (E.E.C.) referred to above. This standard specifies that toughened glass sheet which are intended for use as motor vehicle side and rear windows when broken by localised impact from a defined position on the surface of the glass sheet, two particular positions being at the geometrical centre of the glass sheet and at a position adjacent the edge of the glass sheet, should fracture in accordance with particular criteria. Particle counts taken within 5 cm × 5 cm squares over the whole surface of the fractured glass sheet, excluding a 3 cm wide band around the edge of the glass sheet and a circular area of 7.5 cm radius around the point from which fracture was initiated, should be a minimum of 50 particles per 5 cm × 5 cm square and a maximum of 300 particles per 5 cm × 5 cm square. This standard also requires that the fractured glass sheet should not include any splines of elongated shape and with jagged ends more than 6 cm in length.

It has been found that when attempting to toughen glass 3 mm thick by conventional air toughening practice, it has not been possible, irrespective of the degree to which the glass is toughened, to meet the proposed E.E.C. standard for side and rear windows, particularly when fractured from a break point at the geometrical centre of the glass sheet.

Figure 5:
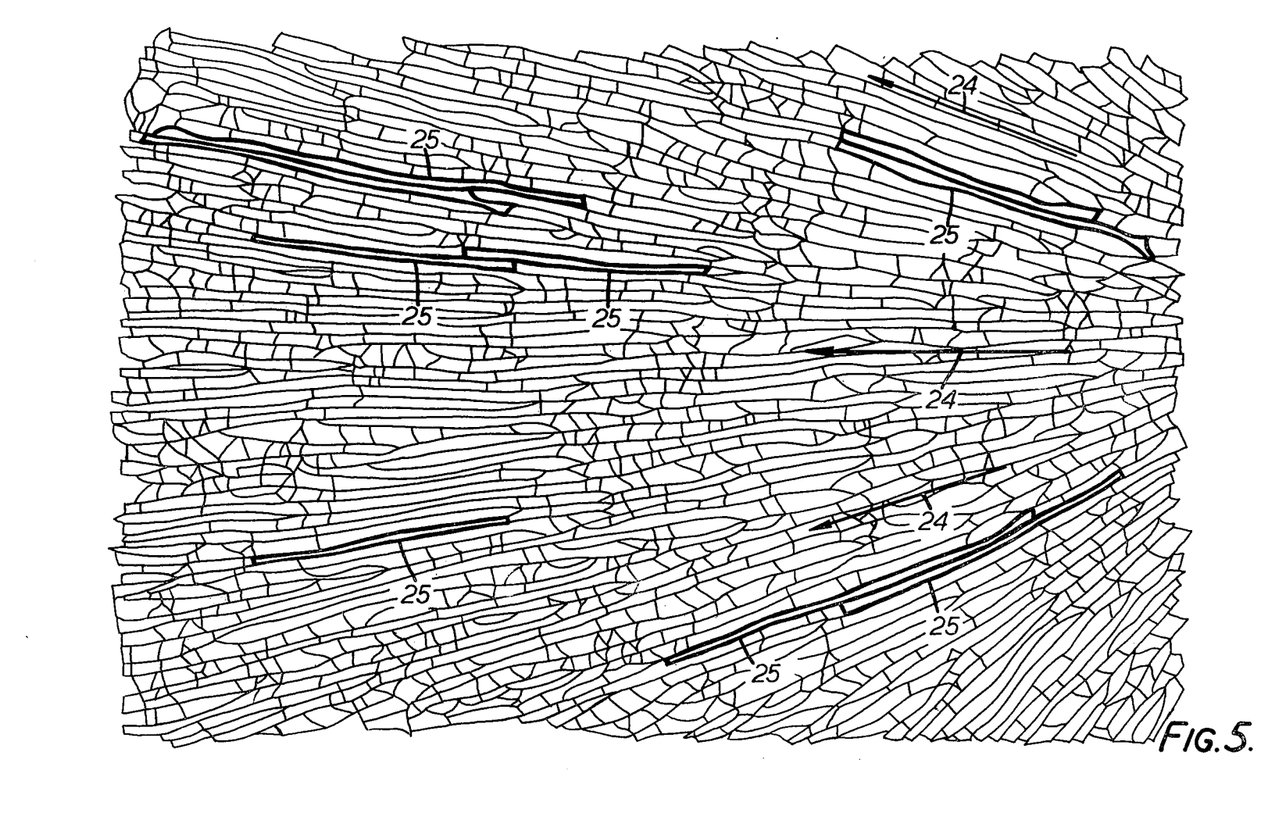
FIG. 5 illustrates the fracture of a 3 mm thick glass sheet toughened by a conventional method.

FIG. 5 is a fracture print of such a 3 mm thick glass sheet which was uniformly toughened by conventional air toughening practice in which the quenching frames were oscillated multi-directionally with respect to the surfaces of the glass sheet. The glass sheet was fractured by localised impact at the break position of the geometrical centre of the glass sheet the direction of propagation of the fracture being as indicated by the arrows 24 in FIG. 5. There are splines 25 of length greater than 6 cm present in the fractured glass sheet so that this glass sheet would not meet the requirements of the proposed E.E.C. standards which prohibits the presence of such splines. The minimum particle count on the glass sheet was also found to be less than the minimum count of 50 particles in a 5 cm × 5 cm square permitted by the proposed E.E.C. standard.

Figure 6:
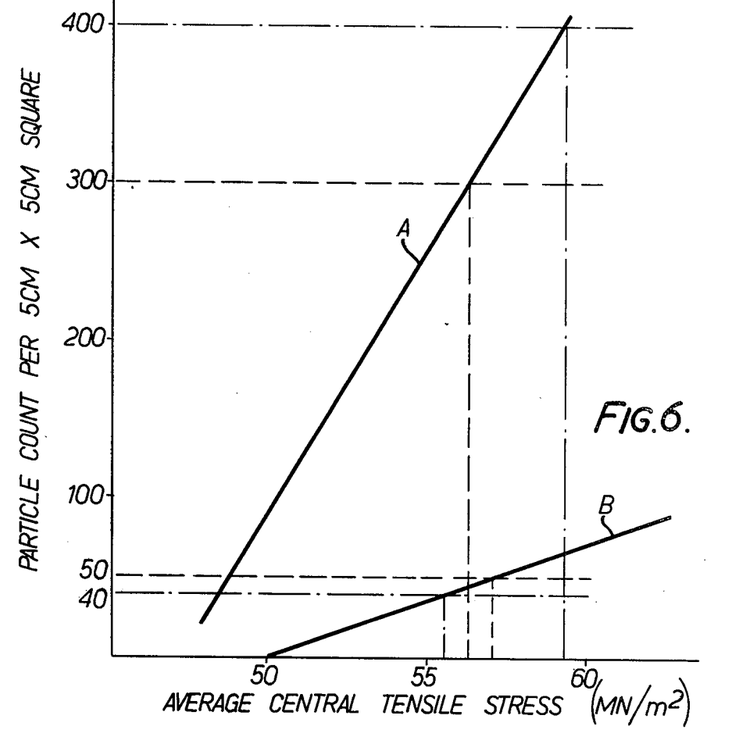
FIG. 6 is a graph illustrating the fracture characteristics of the toughened glass sheet of FIG. 5.
Figure 7:
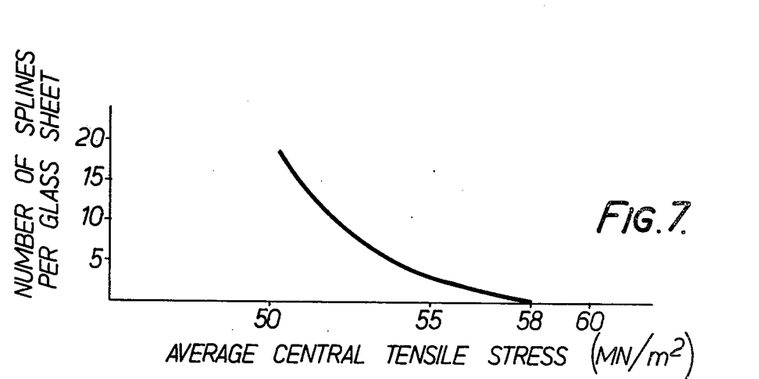
FIG. 7 is a graph which illustrates the number of splines in the fractured glass sheet of FIG. 5.

FIGS. 6 and 7 illustrate the results obtained from the fracture of a number of glass sheets of 3.0 mm thickness which were uniformly toughened in the same manner as the sheet of FIG. 5, to various degrees by conventional air toughening practice.

In FIG. 6 the particle count in a 5 cm × 5 cm square of the glass is plotted against the average central tensile stress in the glass measured by a method employing a laser source as described in the article entitled "Stress Measurements in Tempered Glass Plates by Scattered Light Method with a Laser Source" by S. Bateson, J. W. Hunt, D. A. Dalby and N. K. Sinha; Bulletin of the American Ceramic Society, Vol. 45, No. 2 (1966), pages 193 to 198.

The minimum (50) and maximum (300) limits of particle count specified by the proposed E.E.C. standard are indicated by the horizontal dotted lines in FIG. 6. The line A represents maximum particle counts obtained and the line B represents minimum particle counts. For all values of average central tensile stress which produce a maximum particle count below 300, the minimum particle count is less than 50. When the minimum particle count is greater than 50, the maximum particle count is greater than 300. There is no value of average central tensile stress at which the proposed E.E.C. standard can be complied with.

In FIG. 7 the number of splines of length greater than 6 cm in these fractured glass sheets is plotted against the average central tensile stress in $MN/m^2$, and the resulting graph shows that the average central tensile stress must be greater than about 58 $MN/m^2$ to ensure that there are no such splines in the fractured glass sheet. However the particle count at a stress of 58 $MN/m^2$ or more is much higher than 300.

The graphs of FIGS. 6 and 7 there show that it has not been found possible to toughen a sheet of glass 3 mm thick by conventional air toughening methods, in a manner to satisfy the proposed E.E.C. standard.

The minimum (40) and maximum (400) limits of particle count which may be permitted in a 5 cm × 5 cm square, according to British Standard No. BS 5282 are indicated in FIG. 6 by horizontal chain dotted lines. Glass sheets having a central tensile stress within the range from about 56 $MN/m^2$ to 59.5 $MN/m^2$ meet the British Standard with respect to permissible minimum and maximum particle counts. However FIG. 7 shows that the presence of splines greater than 6 mm long in such glass sheets could present a problem in meeting the requirements of the British Standard. Only glass sheets having a central tensile stress in the range from 58 $MN/m^2$ to 59.5 $MN/m^2$ meet the British Standard with respect to the permissible minimum and maximum particle counts whilst totally avoiding the presence of splines longer than 6 cm in the fractured glass sheets.

The present invention concerns the discovery that glass sheets of the kind used as motor vehicle side or rear windows, which are from 2.5 mm to 3.5 mm thick, particularly sheets 3 mm thick, can be toughened in a way which meets official fracture requirements such as the proposed E.E.C. standard.

Figure 8:
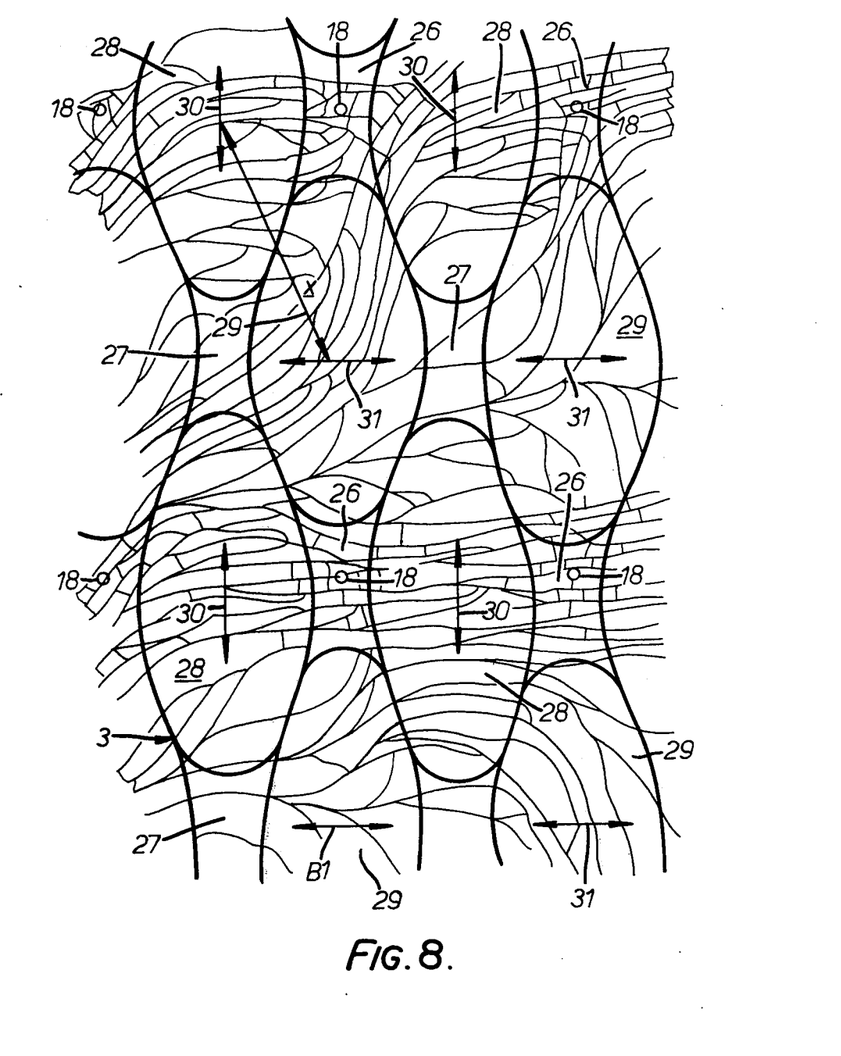
FIG. 8 illustrates the fracture pattern of a differentially toughened glass sheet according to the invention produced by a method using high pressure quenching frames.

Using the apparatus of FIGS. 1 and 2 and by imparting a small vertical oscillation to the high pressure quenching frames 5, a differentially toughened glass sheet according to the invention is produced having a fracture pattern as shown in FIG. 8. The position of the apertures 18 in the perforated tubes 17 of the quenching frames 5 is shown, opposing apertures 18 in the two quenching frames 5 being arranged directly opposite one another. The quenching frames 5 are oscillated vertically through a distance equal to the pitch between adjacent apertures 18, and the apertures 18 are shown in the position which they occupy at the limits of oscillation of the quenching frames 5.

This results in a distribution of localised areas 26 of more highly toughened glass interspersed with areas 27 of lesser toughened glass.

Areas 28 of the glass sheet which are located horizontally between the areas 26 of more highly toughened glass, and areas 29 of the glass sheet which are located vertically between the areas 26 of more highly toughened glass, are subject to an intermediate rate of quenching and have a medium toughening stress. Normal toughening stresses are produced in each of the areas 26, 27, 28 and 29 of the glass sheet to an extent which is dependent on the rate of quenching of those areas. A high central tensile stress which is of equal magnitude in all directions in the plane of the glass sheet is produced in the more highly toughened areas 26, a low central tensile stress is produced in the lesser toughened areas 27, and compensating compressive stresses are produced in both surfaces of the glass sheet.

The medium toughening stresses produced in the areas 28 and 29 of the glass sheet are a combination of the normal toughening stresses of equal magnitude in all directions in the plane of the glass sheet, and additional area stresses which are produced in the areas 28 and 29 due to the different rates at which the adjacent areas 26 and 27 are cooled and contract. These area stresses are not of equal magnitude in all directions in the plane of the glass sheet. The central tensile stress in the areas 28 and 29 of the glass sheet due to the combined effect of the normal toughening stresses and the area stresses can be resolved into unequal principal stresses, in the plane of the glass sheet, namely a major principal tensile stress and a minor principal tensile stress acting at right angles to the major principal tensile stress. As shown by the arrows 30 in FIG. 8 the major principal tensile stress in the areas 28 acts in the direction parallel to the direction of oscillation of the quenching frames 5, between the areas 26 of more highly toughened glass. The arrows 31 in the areas 29 show that the major principal tensile stress acts in a direction perpendicular to the direction of the major principal tensile stress in the areas 28 i.e. at right angles to the direction of oscillation of the quenching frames 5.

The size of particles produced in a fractured glass sheet depends on the degree of toughening of the glass sheet and in general the fineness of the particles increases with the degree of toughening. Hence particles of relatively small size are produced in the more highly toughened areas 26, in the lesser toughened areas 27 larger particles are produced, and in the areas 28 and 29 having a medium toughening stress particles of medium size are produced. This distribution of small, larger and medium, sized particles is produced over the whole surface of the fractured glass sheet, and the requirements of the official standards with regard to minimum and maximum particle counts are met.

When a toughened sheet of glass is fractured the cracks tend to run substantially perpendicular to the direction of major principal stress in the glass. This is illustrated in FIG. 8 where the cracks tend to run perpendicular to the direction of the major principal stress 30 and 31 in the areas 28 and 29 and are directed towards the more highly toughened areas 26 where the particles of smallest size are produced.

As the major principal stresses in adjacent areas 28 and 29 are perpendicular to one another, a wavy type of fracture pattern results in which the size of the areas 28 and 29 limits the maximum length of the particles which can be produced. Hence the fracture pattern of FIG. 8 does not include elongated particles, or splines, of the kind which are found in the customary radial type of fracture pattern produced in a conventionally uniformly toughened glass sheet as shown in FIG. 5.

Figure 9:
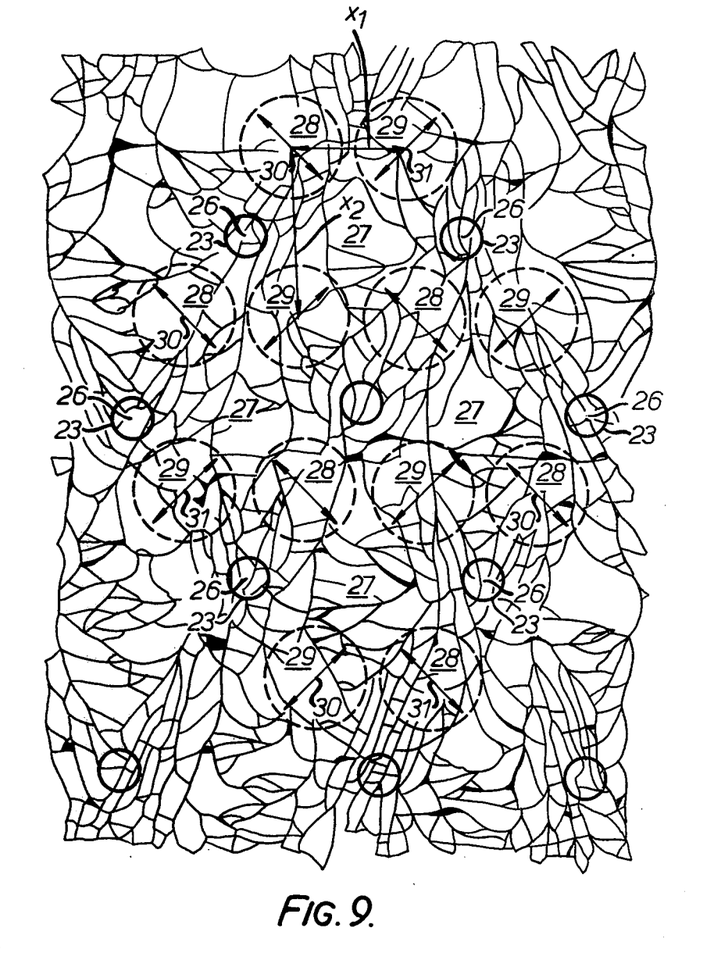
FIG. 9 illustrates the fracture pattern of a differentially toughened glass sheet according to the invention produced by a method using low pressure quenching boxes.

FIG. 9 illustrates the fracture pattern of a toughened glass sheet according to the invention which has been toughened by a method employing low pressure quenching boxes 5 as shown in FIGS. 3 and 4. In this method the quenching boxes 5 are held stationary and the quenching nozzles 23 are positioned as shown in FIG. 9. Opposing nozzles 23 of the two quenching boxes 5 are arranged directly opposite one another.

This method results in the production of a distribution of localised areas 26 of more highly toughened glass in the glass sheet in the region of the position of the blowing nozzles 23. Areas 27 of lesser toughened glass are produced in the glass sheet at positions directly between the nozzles 23. Areas 28 of glass having a medium toughening stress and in which the principal stresses are unequal are produced in regions located diagonally between the nozzles 23 in one direction. In each of the areas 28 the major principal stress acts in the direction indicated by the arrows 30.

Areas 29 of the glass located diagonally between the nozzles 23 in the other direction, also have a medium toughening stress and unequal principal stresses represented by arrows 31. The major principal stress 31 in each area 29 acts in a direction substantially perpendicular to the direction of the major principal stress in the areas 28.

Figure 10:
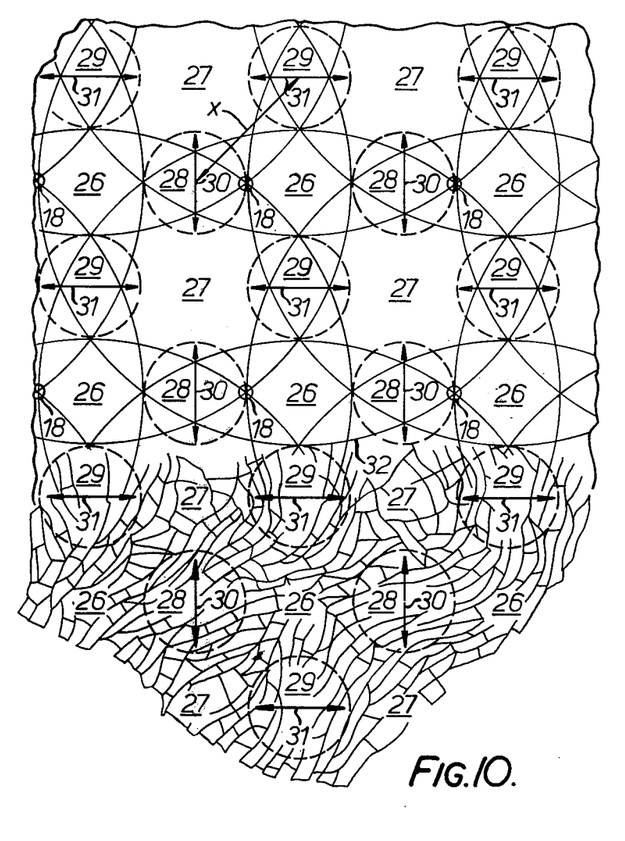
FIG. 10 illustrates the fracture of a differentially toughened glass sheet according to the invention produced by a further method using high pressure quenching frames.

FIG. 10 illustrates the fracture of a toughened glass sheet according to the invention, when made by a method using the high pressure quenching frames 5 of FIGS. 1 and 2, but in which the quenching frames 5 are oscillated in a circular manner. The blowing apertures 18 in the quenching frames are arranged in a square array and move in circular paths 32 over the surfaces of the glass sheet, which circular paths 32 are of larger diameter than the distance between adjacent apertures 18, but need not necessarily be of larger diameter.

This results in the production in the glass sheet of localised areas 26 of more highly toughened glass at locations where there is a maximum interception of the paths of the quenching apertures 18. Areas 27 of lesser toughened glass are produced in the glass sheet at positions interspersed between the areas 26 where there is a minimum interception of the paths of the quenching apertures 18.

Areas 28 of glass having unequal principal stresses are produced at positions horizontally between the areas 26 of more highly toughened glass. In each area 28 the major principal stress extends vertically as shown by the arrows 30 in FIG. 10.

Areas 29 of glass which also have unequal principal stresses are produced at positions vertically between the areas 26 of more highly toughened glass. In each area 29 the major principal stress extends horizontally as shown by the arrows 31 in FIG. 10 i.e. in a direction perpendicular to the direction of the major principal stress in each of the areas 28.

The fracture pattern of the glass sheets shown in FIGS. 9 and 10 is similar to that of the glass sheet shown in FIG. 8. Particles of relatively small size are produced in the more highly toughened areas 26 while particles of larger size are produced in the lesser toughened areas 27 of the glass sheets. The cracks tend to run perpendicular to the direction of the major principal tensile stress in the areas 28 and 29 of the glass sheets. The fracture pattern of a glass sheet in accordance with the invention depends principally on the average central tensile stress present in the glass sheet, on maximum principal stress differences in the areas 28 and 29 of the glass sheet, and on the spacing between the centres of adjacent areas 28 and 29. This spacing $x$ is indicated in FIGS. 8, 9 and 10. These factors, which determine whether or not a glass sheet will meet official fracture standards, are governed by the processing conditions; principally by the size and spacing of the blowing apertures 18 in the high pressure quenching frame of FIGS. 1 and 2, or of the blowing nozzles 23 of the low pressure quenching boxes of FIGS. 3 and 4; by the separation distance between the quenching frames or boxes; by the air feed pressure to the quenching frames or boxes; and in the case of the high pressure quenching frames, by the manner in which the frames are oscillated.

The average tensile stress present in each glass sheet was measured by the method described in the above mentioned article "Stress Measurements in Tempered Glass Plates by Scattered Light Method with a Laser Source". This provides a measurement of the central tensile stress present in the glass sheet averaged over the areas 26 of more highly toughened glass, the areas 27 of lesser toughened glass and the areas 28 and 29 of medium toughened glass.

The maximum principal stress differences in areas 28 and 29 of the glass sheet were measured by the Senarmont method described in the article entitled "A Note on the use of the Senarmont Method for Measuring Stress in Glass" by H. Rawson; Journal of the Society of Glass Technology, Vol XLII, pages 119T to 124T.

The following tables are of examples of toughened glass sheets according to the invention, produced by three methods referred to as Methods 1, 2 and 3.

METHOD 1

Vertically oscillating high pressure quenching frames were used in the manner described above with reference to FIGS. 1 and 2, to produce stresses in the glass as described with reference to FIG. 8. The high pressure quenching frames have rectangular array of quenching apertures 18.

| | |
|---|---|
| Diameter of quenching apertures 18 | = 2mm |
| Horizontal spacing of quenching apertures 18 | = 25mm |
| Vertical spacing of quenching apertures 18 | = 50mm |
| Amplitude of vertical oscillation of quenching frames | = 50mm. |

METHOD 2

Fixed low pressure quenching boxes were used in the manner described with reference to FIGS. 3 and 4, to produce stresses in the glass as described with reference to FIG. 9. The low pressure quenching boxes have a Domino 5 array of quenching nozzles 23.

| | |
|---|---|
| Diameter of quenching nozzles 23. | = 7mm |
| Horizontal spacing of quenching nozzles 23 (distance a, FIG. 3) | = 34mm |
| Vertical spacing of quenching nozzles 23 (distance b, FIG. 3) | = 47mm. |

METHOD 3

The high pressure quenching frames of FIGS. 1 and 2 were used, having a square array of quenching apertures 18, to produce stresses in the glass as described with reference to FIG. 10.

| | |
|---|---|
| Diameter of quenching apertures 18 | = 2mm |
| Horizontal and vertical spacing of quenching apertures 18 | = 32mm |

-continued

| | |
|---|---|
| Diameter of circular oscillation of quenching frames, | = 80mm |

Each of the following Tables, I, II and III compares the characteristics of glass sheets produced by Methods 1, 2 and 3. In the tables the column headed "Principal Stress Difference" gives the difference between the principal stresses in areas where this difference is a maximum, such as the areas 28 and 29 in the glass sheets illustrated in FIGS. 8, 9 and 10.

The column headed "Spacing $x$ Between Areas Having Principal Stress Difference" gives the distance $x$ between the centres of adjacent areas 28 and 29 where the principal stress difference is a maximum, and in which areas 28 and 29 as shown in FIGS. 8, 9 and 10, the directions of the major principal stresses are substantially perpendicular to one another.

TABLE I

| Method of Manufacture | Air Feed Pressure $(N/m^2 \times 10^3)$ | Frame Seperation (mm) | Average Central Tensile Stress $(MN/m^2)$ | Principal Stress Difference $(MN/m^2)$ | Spacing X Between Areas Having Principal Stress Difference (mm) | Maximum Particle Count | Minimum Particle Count |
|---|---|---|---|---|---|---|---|
| 1 | 460 | 60 | 57.0 | 22 | 28 | 250 | 40 |
| 1 | 520 | 60 | 59.0 | 22 | 28 | 310 | 63 |
| 1 | 590 | 60 | 62.0 | 22 | 28 | 390 | 87 |
| 2 | 16.25 | 50 | 57.0 | 14 | 17 min ($x_1$) 24 max ($x_2$) | 242 | 46 |
| 2 | 18.0 | 50 | 59.0 | 14 | 17 min ($x_1$) 24 max ($x_2$) | 285 | 60 |
| 2 | 21.0 | 50 | 62.0 | 14 | 17 min ($x_1$) 24 max ($x_2$) | 370 | 90 |
| 3 | 395 | 75 | 57.0 | 8 | 22 | 230 | 44 |
| 3 | 435 | 75 | 59.0 | 8 | 22 | 290 | 58 |
| 3 | 505 | 75 | 62.0 | 8 | 22 | 396 | 93 |

Glass thickness = 2.5mm
Glass Size = 1100 × 500mm rectangular sheets

TABLE II

| Method of Manufacture | Air Feed Pressure $(N/m^2 \times 10^3)$ | Frame Box Separation (mm) | Average Central Tensile Stress $(MN/m^2)$ | Principal Stress Difference $(MN/m^2)$ | Spacing x Between Areas Having Principal Stress Difference (mm) | Maximum Particle Count | Minimum Particle Count |
|---|---|---|---|---|---|---|---|
| 1 | 275 | 70 | 54.5 | 22 | 28 | 220 | 42 |
| 1 | 310 | 70 | 56.0 | 22 | 28 | 250 | 65 |
| 1 | 367 | 70 | 59.0 | 22 | 28 | 320 | 90 |
| 1 | 430 | 70 | 62.0 | 22 | 28 | 398 | 120 |
| 2 | 8.0 | 65 | 54.5 | 16 | 17 min ($x_1$) 24 max ($x_2$) | 180 | 43 |
| 2 | 9.0 | 65 | 56.0 | 16 | 17 min ($x_1$) 24 max ($x_2$) | 225 | 60 |
| 2 | 10.5 | 65 | 59.0 | 16 | 17 min ($x_1$) 24 max ($x_2$) | 280 | 81 |
| 2 | 12.5 | 65 | 62.0 | 16 | 17 min ($x_1$) 24 max ($x_2$) | 360 | 110 |
| 3 | 225 | 100 | 54.5 | 8 | 22 | 205 | 40 |
| 3 | 247 | 100 | 56.0 | 8 | 22 | 230 | 60 |
| 3 | 290 | 100 | 59.0 | 8 | 22 | 302 | 76 |
| 3 | 360 | 100 | 62.0 | 8 | 22 | 385 | 98 |

Glass thickness = 3.0mm
Glass size = 1100 × 500mm rectangular sheets

TABLE III

| Method of Manufacture | Air Feed Pressure $(N/m^2 \times 10^3)$ | Frame Box Seperation (mm) | Average Central Tensile Stress $(MN/m^2)$ | Principal Stress Difference $(MN/m^2)$ | Spacing x Between Areas Having Principal Stress Difference (mm) | Maximum Particle Count | Minimum Particle Count |
|---|---|---|---|---|---|---|---|
| 1 | 210 | 75 | 53.0 | 22 | 28 | 195 | 40 |

TABLE III-continued

| Method of Manufacture | Air Feed Pressure (N/m² × 10³) | Frame Box Seperation (mm) | Average Central Tensile Stress (MN/m²) | Principal Stress Difference (MN/m²) | Spacing x Between Areas Having Principal Stress Difference (mm) | Maximum Particle Count | Minimum Particle Count |
|---|---|---|---|---|---|---|---|
| 1 | 240 | 75 | 55.0 | 22 | 28 | 210 | 56 |
| 1 | 295 | 75 | 59.0 | 22 | 28 | 305 | 90 |
| 1 | 345 | 75 | 62.0 | 22 | 28 | 365 | 133 |
| 2 | 6.5 | 65 | 53.0 | 16 | 17 min ($x_1$) 24 max ($x_2$) | 175 | 50 |
| 2 | 7.5 | 65 | 55.0 | 16 | 17 min ($x_1$) 24 max ($x_2$) | 200 | 58 |
| 2 | 9.0 | 65 | 59.0 | 16 | 17 min ($x_1$) 24 max ($x_2$) | 280 | 85 |
| 2 | 10.25 | 65 | 62.0 | 16 | 17 min 24 max | 370 | 120 |
| 3 | 150 | 100 | 53.0 | 8 | 22 | 180 | 42 |
| 3 | 170 | 100 | 55.0 | 8 | 22 | 240 | 60 |
| 3 | 205 | 100 | 59.0 | 8 | 22 | 285 | 81 |
| 3 | 240 | 100 | 62.0 | 8 | 22 | 390 | 130 |

Glass thickness = 3.5mm
Glass size = 1100 × 500 rectangular sheets

Figure 11:
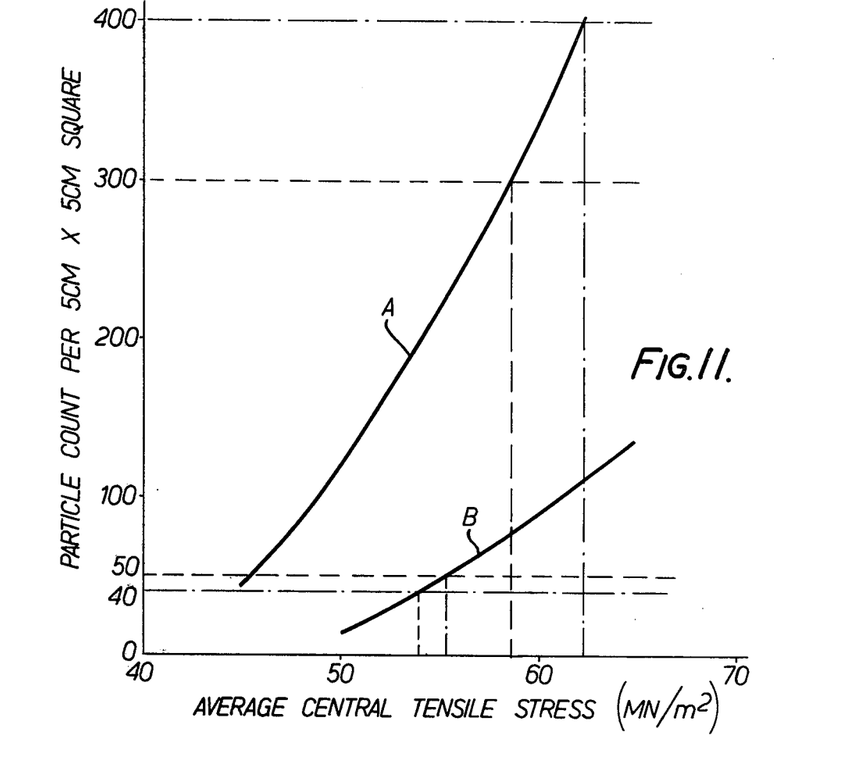
FIG. 11 is a graph summarising the fracture characteristics of toughened 3 mm thick glass sheets of the invention, as shown in FIGS. 8, 9 and 10, having characteristics in accordance with the invention.

FIGS. 11 and 12 illustrate the results of Table II relating to 3 mm thick glass sheets. In FIG. 11 the particle count in a 5 cm × 5 cm square of each glass sheet is plotted against the average central tensile stress in the unbroken glass. The minimum (50) and the maximum (300) limits of particle count specified by the draft E.E.C. standard are indicated by horizontal dotted lines. The graph A represents maximum particle counts and the graph B represents minimum particle counts, which graphs show that the requirements of the proposed E.E.C. standard concerning minimum and maximum particle counts are met for all values of central tensile stress from a minimum of 55.5 MN/m² to a maximum of 59.5 MN/m².

Figure 12:
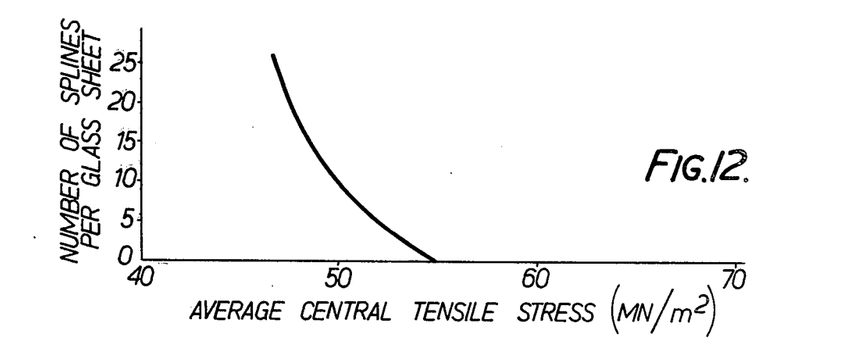
FIG. 12 is a graph which illustrates that no splines are present in the fractured glass sheet of FIGS. 8, 9 and 10.

In FIG. 12 the number of splines present in each of the fractured glass sheets of Table II, is plotted against the average central tensile stress in the unbroken glass. It is noted that splines are only present in the fractured glass sheets at values of average central tensile stress less than 55 MN/m². No splines exist in fractured glass sheets having an average central tensile stress in the range of from 55.5 MN/m² to 59.5 MN/m², which sheets, as shown in FIG. 11, meet the requirements of the proposed E.E.C. standard with regard to minimum and maximum particle counts.

The minimum (40) and maximum (400) limits of particle count a 5 cm × 5 cm square permitted by British Standard No. BS 5282 are indicated on FIG. 11 by horizontal chain-dotted lines. Glass sheets having an average central tensile stress in the range from 54 MN/m² to 62 MN/m² meet the requirements of the British Standard. FIG. 12 shows that splines of length greater than 6 cm are not present in the fracture pattern of glass sheets having a central tensile stress greater than 55 MN/m². Therefore glass sheets having a central tensile stress in the range of from 55 MN/m² to 62 MN/m² meet the requirements of the British Standard.

This range is broader and far easier to operate in commercially, than the range of from 58 MN/m² to 59.5 MN/m² within which, as described above with reference to FIGS. 6 and 7, it is necessary to operate in order to meet the requirements of the British Standard when uniformly toughening 3 mm thick glass sheets by conventional air toughening methods.

Figure 13:
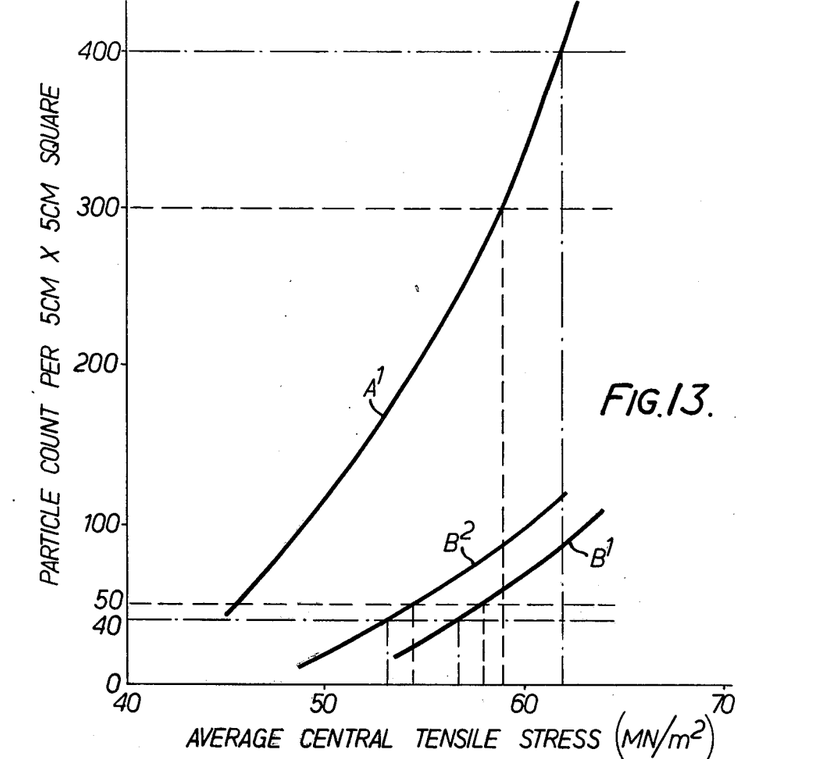
FIG. 13 is a graph similar to FIG. 11 for glass 2.5 mm and 3.5 mm thick.
Figure 14:
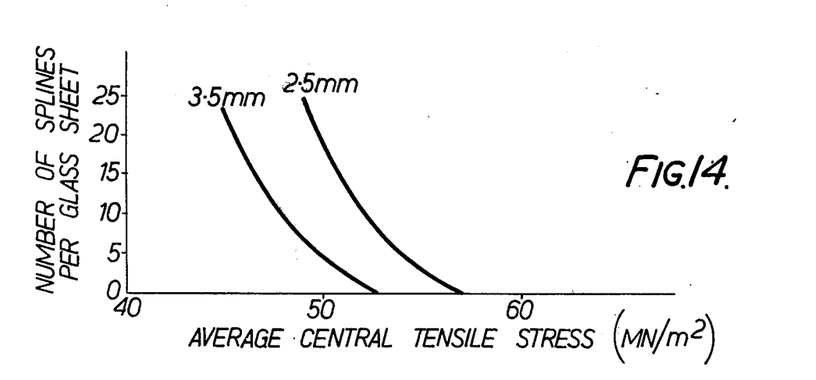
FIG. 14 is a graph similar to FIG. 12 for the glass sheet whose fracture characteristics are plotted in FIG. 13.

FIGS. 13 and 14 illustrate the results of Tables I and II relating to 2.5 mm and 3.5 mm thick glass sheets as toughened in accordance with the invention. In FIG. 13 the particle count in a 5 cm × 5 cm square of each glass sheet is plotted against the average central tensile stress in the unbroken glass.

The line $A^1$ represents maximum particle counts for both glass thicknesses 2.5 mm and 3.5 mm, the line $B^1$ represents minimum particle counts for 2.5 mm thick glass sheets, and the line $B^2$ represents minimum particle counts for 3.5 mm thick glass sheets. The limits of minimum and maximum particle counts specified by the proposed E.E.C. standard and by the British Standard are shown.

The particle count requirements of the proposed E.E.C. standard are met by 2.5 mm thick glass sheets which have an average central tensile stress in the range from 58 MN/m² to 59.5 MN/m².

In FIG. 14 the number of splines present in the 2.5 mm and 3.5 mm thick glass sheets of Tables I and II, when fractured, is plotted against the average central tensile stress in the unbroken glass. Splines are only present in the fractured 2.5 mm thick glass sheets at values of central tensile stress less than 57 MN/m², which is below the range of from 58 MN/m² to 59.5 MN/m² central tensile stress within which the requirements of the draft E.E.C. standard regarding particle count can be met.

The particle count requirements of the British Standard are met for 2.5 mm thick glass sheets which have a central tensile stress in the range of from 56.5 MN/m² to 62 MN/m², and FIG. 14 shows that no splines will be present in the majority of such glass sheets when fractured as the minimum value of central tensile stress at which splines will be produced is again 57 MN/m².

In the case of 3.5 mm thick glass sheets, FIG. 13 shows that the particle count requirements of the draft E.E.C. standard are met for all values of central tensile stress in the range of from 54.5 MN/m² to 59.5 MN/m². FIG. 14 shows that no splines will be present in such glass sheets, when fractured, because the threshold value of central tensile stress at which splines are produced is 53 MN/m².

FIG. 13 also shows that for 3.5 mm thick glass sheets the particle count requirements of the British Standard are met for values of central tensile stress in the range 53 MN/m² to 62 MN/m². FIG. 14 shows that the threshold value of central tensile stress for the production of splines in such glass sheets is 53 MN/m$^2$, and the glass sheets will be free of splines when fractured.

From the results in Tables it is apparent that in the case of glass sheets of thickness in the range 2.5 mm to 3.5 mm the requirements of the draft E.E.C. standard regarding minimum and maximum particle counts are met by toughening the glass sheets in accordance with the invention so as to have an average central tensile stress in the range from a maximum of 59.5 MN/m$^2$ for all thicknesses from 2.5 mm to 3.5 mm to a minimum of 58 MN/m$^2$ for 2.5 mm thick glass varying inversely with glass thickness down to a minimum of 54.5 MN/m$^2$ for 3.5 mm thick glass.

It is also generally the case that no splines will be present in such glass sheets when fractured.

The data also shows that the requirements of British Standard No. BS 5282 regarding minimum and maximum particle counts are met by toughening glass sheets of thickness in the range 2.5 mm to 3.5 mm in accordance with the invention so as to have an average central tensile stress in the range from a maximum of 62 MN/m$^2$ for all thicknesses from 2.5 mm to 3.5 mm to a minimum of 56.5 MN/m$^2$ for 2.5 mm thick glass varying inversely with thickness down to a minimum of 53 MN/m$^2$ for 3.5 mm thick glass.

Again it is generally the case that no splines will be present in such glass sheets when fractured.

The examples of Tables I, II and III show that in the areas of the glass sheets where the principal stresses are unequal the maximum principal stress differences may be on average in the range 8 MN/m$^2$ to 22 MN/m$^2$. In practice it has been found that the average of the maximum principal stress differences may be up to 25 MN/m$^2$.

The examples of Tables I, II and III also show that the spacing between adjacent areas of the glass sheets where the principal stresses are unequal and where the principal stress difference is a maximum may be in the range of from 17 mm to 28 mm as measured between the centres of such adjacent areas. It has been found in practice that the spacing between such areas may be in the range 15 mm to 30 mm.

When the glass is quenched by circular oscillation of the high pressure quenching frames of FIGS. 1 and 2 as in METHOD 3, the quenching frames, and hence the quenching jets emanating from the frames, may be held stationary for a predetermined time during the quenching period. The circular oscillation may be delayed for 1 to 2 seconds after commencement of the quenching period. This has been found to increase the average central tensile stress and the principal stress difference, and in some experiments which were carried out an increase was seen in the minimum particle count although without any significant change in the maximum particle count.

In these experiments sheets of glass 3.0 mm thick and of size 800 mm × 800 mm were toughened using the quenching frames of FIGS. 1 and 2.

The quenching frames were set up as follows:

| | |
|---|---|
| Diameter of quenching apertures 18 | = 2 mm |
| Horizontal and vertical spacing of quenching apertures 18 | = 32 mm |
| Diameter of circular oscillation of quenching frames | = 32 mm |
| Air feed pressure to quenching frames | = 248 × 10$^3$ N/m$^2$ |
| Separation of quenching frames | = 84 mm |

Two sheets of glass were quenched, the first, Glass A, with the circular oscillation of the frames throughout a 12 second quenching period, and the second, Glass B, with the circular oscillation delayed for 1 second from the beginning of the 12 second period.

The characteristics of the sheets were as follows:

| Glass | Average Central Tensile Stress (MN/m$^2$) | Principal Stress Difference (MN/m$^2$) | Spacing x between areas having principal stress differences (mm) | Maximum Particle count | Minimum Particle count |
|---|---|---|---|---|---|
| A | 56.5 | 17.0 | 23 | 352 | 46 |
| B | 58.1 | 26.0 | 23 | 347 | 85 |

These results indicate that regulation of the time of oscillation of the quenching jets, within the total quenching period, can regulate the stress distribution in the glass and the characteristics of the fracture within the predetermined specified limits.

As a variant the jets may be oscillated for the first 0.5 seconds in order to "set" the glass surfaces, then held stationary for 1 or 2 or more seconds, and if desired finally oscillated for the rest of the quenching period.

The glass sheets produced by the method of the invention and illustrated in FIGS. 8, 9 and 10 have a regular distribution of regions 26 of more highly toughened glass uniformly interspersed with regions 27 of lesser toughened glass. These regions may vary in size in a predetermined manner in different parts of the sheet and the distribution is not then regular. This means that the principal stress difference is different in different intermediate regions 28 and 29 of the sheet. These variations have localised effects on the fracture of the sheet and can be employed as a means for providing different fracture characteristics in different portions of the sheet.

Such regulation of the time of oscillation of the quenching jets within the total quenching period can also be applied when the glass is quenched by vertical oscillation of high pressure blowing frames as in METHOD 1.

We claim:

1. A glass sheet for use as a side or rear window for a motor vehicle and of thickness in the range 2.5 mm to 3.5 mm which sheet is differentially quenched to produce in the glass sheet a distribution of regions of more highly toughened glass interspersed with regions of lesser toughened glass, the average central tensile stress in the glass sheet being in the range of from a maximum of 62 MN/m$^2$ for all glass thicknesses from 2.5 to 3.5 mm to a minimum of 56.5 MN/m$^2$ for 2.5 mm thick glass varying inversely with thickness down to a minimum of 53 MN/m$^2$ for 3.5 mm thick glass, and there being a distribution of medium toughened glass areas interspersed among said more highly toughened and said lesser toughened regions in the glass sheet and in which there are major and minor principal stresses acting in the plane of the glass sheet, the difference between said major and minor principal stresses in at least some of said medium toughened areas being at a maximum in the range 8 MN/m$^2$ to 25 MN/m$^2$, the major principal stresses in adjacent ones of such medium toughened areas being in substantially different directions, and the distance between the centres of such adjacent areas being in the range 15 mm to 30 mm, the number and location of such adjacent areas being sufficient that upon fracture there is an absence of splines of more than 6 cm in length in the glass sheet.

2. A glass sheet according to claim 1, wherein the average central tensile stress in the sheet is in the range from a maximum of 59.5 MN/m$^2$ for all glass thickness from 2.5 mm to 3.5 mm to a minimum of 58 MN/m$^2$ for 2.5 mm thick glass varying inversely with thickness down to a minimum of 54.5 MN/m$^2$ for 3.5 mm thick glass.

3. A glass sheet according to claim 1, in which there is a regular distribution of said regions of more highly toughened glass uniformly interspersed with regions of lesser toughened glass.

4. The glass sheet according to claim 1 wherein the regions of more highly toughened glass and less toughened glass are interspersed throughout the glass sheet.